(12) United States Patent
Sprea et al.

(10) Patent No.: US 6,490,922 B1
(45) Date of Patent: Dec. 10, 2002

(54) SYSTEM FOR CONTROLLING THE LEVEL OF THE LIQUID CONTAINED IN A LPG TANK OR THE LIKE

(75) Inventors: Dino Sprea, Verona (IT); Fabrizio Galeotti, Verona (IT)

(73) Assignee: Areagas s.r.l., Verona (IT)

( * ) Notice: Subject to any disclaimer, the term of this patent is extended or adjusted under 35 U.S.C. 154(b) by 0 days.

(21) Appl. No.: 09/458,773

(22) Filed: Dec. 10, 1999

(30) Foreign Application Priority Data

Mar. 31, 1999 (IT) .......................................... VR99A0032

(51) Int. Cl.⁷ ............................................. G01F 23/36
(52) U.S. Cl. ....................... 73/313; 73/308; 73/DIG. 5; 340/870.16; 340/870.02
(58) Field of Search .......................... 73/308, 313, 317, 73/DIG. 5; 340/870.02, 870.16

(56) References Cited

U.S. PATENT DOCUMENTS

| | | | | |
|---|---|---|---|---|
| 4,061,901 A | * | 12/1977 | Saunders et al. | 73/313 X |
| 4,129,039 A | * | 12/1978 | Pignato | 73/310 |
| 4,422,528 A | * | 12/1983 | Luchessa et al. | 73/321 |
| 4,459,584 A | * | 7/1984 | Clarkson | 340/621 |
| 4,598,584 A | | 7/1986 | Dombrowski et al. | 73/308 |
| 4,688,028 A | * | 8/1987 | Conn | 340/625 |
| 5,023,806 A | | 6/1991 | Patel | 73/317 X |
| 5,056,049 A | | 10/1991 | O'Neill | 340/623 X |
| 5,305,639 A | * | 4/1994 | Pontefract | 73/317 |
| 5,410,913 A | * | 5/1995 | Blackburn | 73/313 |
| 5,435,181 A | * | 7/1995 | Koebernik | 73/313 |
| 5,708,367 A | * | 1/1998 | Tousson | 324/660 |
| 5,708,424 A | * | 1/1998 | Orlando et al. | 340/870.08 |
| 5,736,937 A | * | 4/1998 | McGirr et al. | 340/870.16 |
| 6,041,650 A | * | 3/2000 | Swindler et al. | 73/317 |
| 6,253,611 B1 | * | 7/2001 | Varga et al. | 73/319 |
| 6,317,029 B1 | * | 11/2001 | Fleeter | 340/10.32 |
| 6,333,975 B1 | * | 12/2001 | Brunn et al. | 340/870.02 |
| 6,336,362 B1 | * | 1/2002 | Duenas | 73/313 |
| 6,345,214 B1 | * | 2/2002 | Dulphy-Vigor et al. | 340/619 |

FOREIGN PATENT DOCUMENTS

| | | |
|---|---|---|
| EP | 0593085 | 4/1994 |
| EP | 0718607 | 6/1996 |
| FR | 2717575 | 3/1994 |

\* cited by examiner

*Primary Examiner*—Hezron Williams
*Assistant Examiner*—Michael Cygan
(74) *Attorney, Agent, or Firm*—Notaro & Michalos P.C.

(57) ABSTRACT

A system detects the level of a liquid contained in a liquid gas tank or the like by using a magnet.

This system is mounted on a tank (1). The tank is usually provided with a mechanical level indicator. The mechanical level indicator transmits a certain angular rotation to a stem (2). The upper end of the stem is connected with a magnet. The magnet is placed within a flanged body (3) which is fixed on the tank surface.

A casing (4) including a transmitting apparatus (6), coupled with at least a magnetic reader (5) is arranged out of the tank (1) and over the magnet which is placed within the flanged body (3).

On the basis of the angular displacement of the magnet, the transmitting apparatus and magnetic reader translate the filling level of the tank in signals to be transmitted to suitable receiving devices.

4 Claims, 1 Drawing Sheet

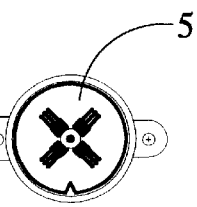
Fig. 2
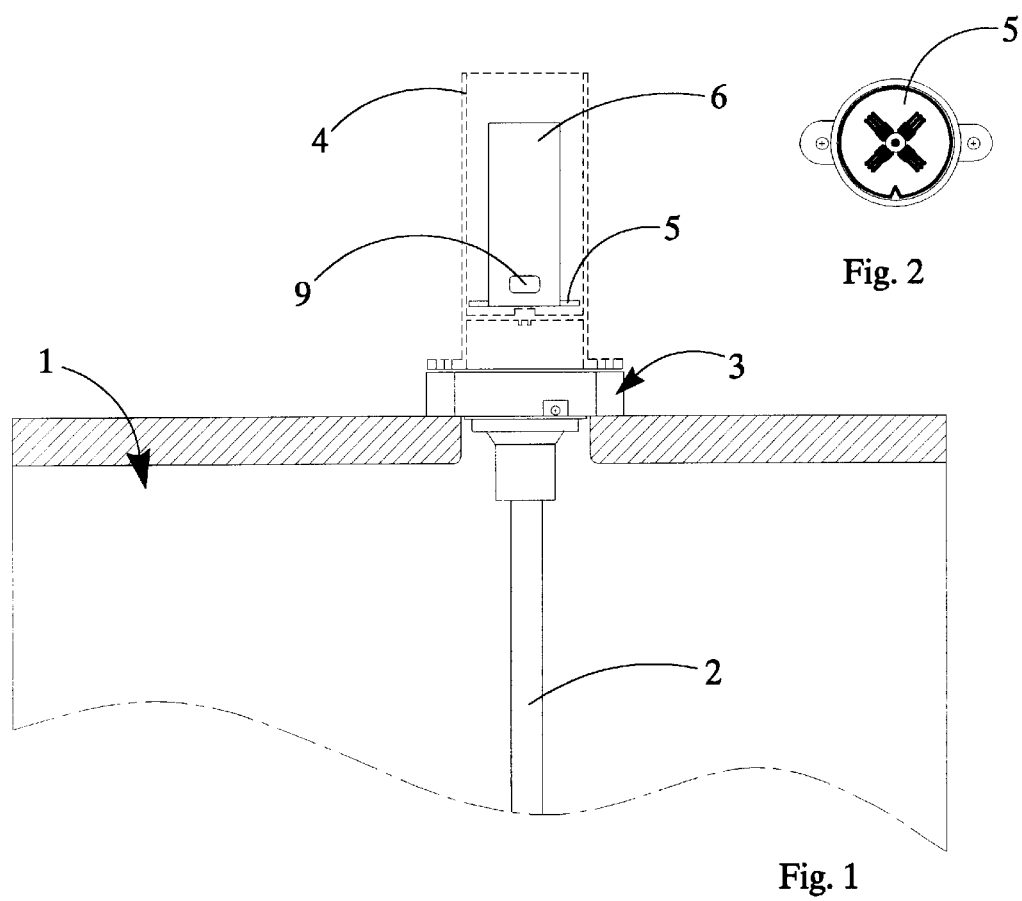
Fig. 1
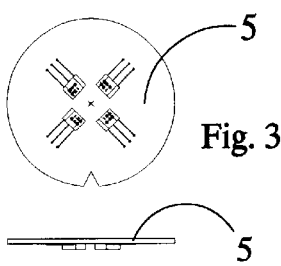
Fig. 4
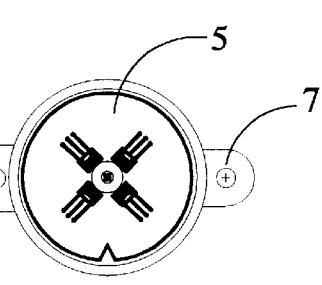
Fig. 3
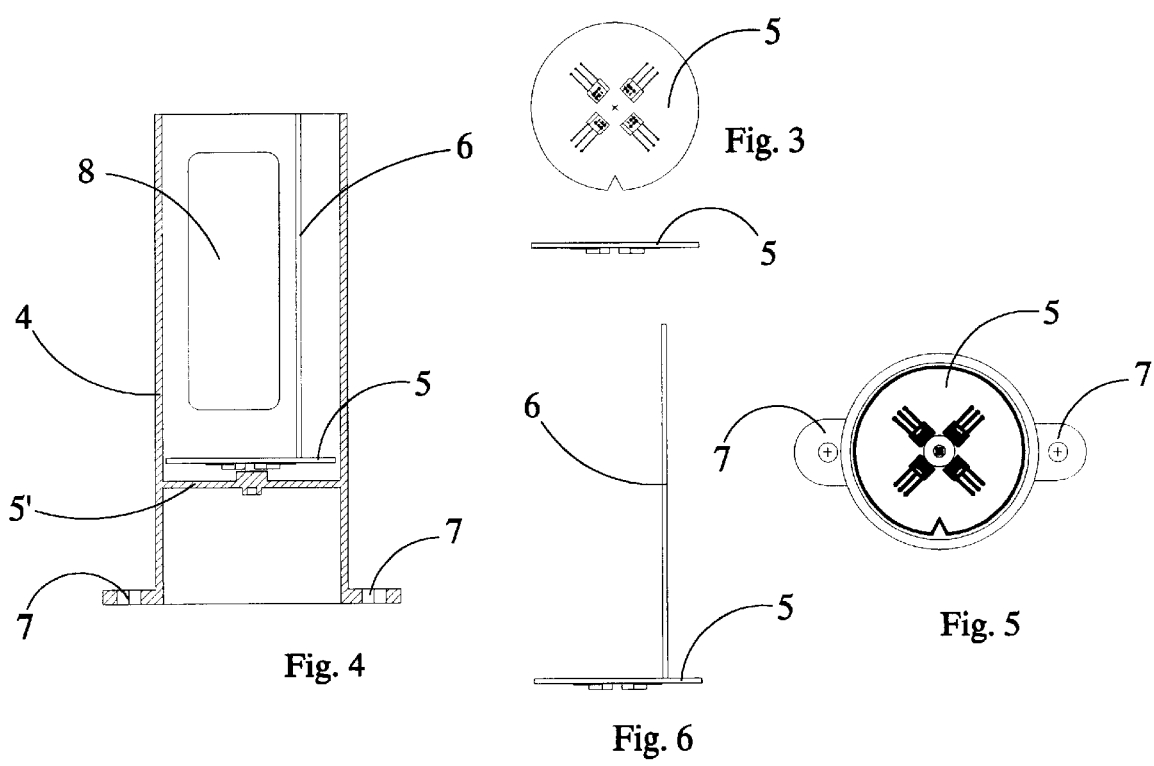
Fig. 5
Fig. 6

SYSTEM FOR CONTROLLING THE LEVEL OF THE LIQUID CONTAINED IN A LPG TANK OR THE LIKE

FIELD AND BACKGROUND OF THE INVENTION

The present invention proposes a system for controlling the level of a liquid contained in a LPG tank or the like through a particular use of a magnetic detector.

This controlling and detecting system detects the inner state of the tank by means of a magnet. More precisely, this system takes advantage of the generated magnetic field and permits an electronic reading of the position of the liquid level. The system collects data and transforms them in radio signals to be detected by suitable control and/or alarm instruments.

In general, the detecting system according to the invention has an advantage over the prior art since it permits to avoid a direct visual control of the state of filling of the tank by the operator. In this way, it is possible to solve the problems relating to the running of the distribution both for single firms and associated firms.

As it is known, the liquid petroleum gas or LPG for a domestic or industrial use is contained in suitable metal tanks. These tanks are pressurized and completely hermetic.

Since the structure of such tanks is completely hermetic, it is not possible to verify the level of the contained liquid with a direct visual control.

Till today, the only possibility of controlling the gas level is the employment of mechanical level gauges which are provided within the tank itself and comprise a float which is equipped with a suitable gear on which a magnet is mounted.

The aforesaid magnet is connected with an outer dial from which it is therefore possible to control the level of the LPG by means of a suitable indicator.

However, this control system compels the user to make frequent checks. The user is compelled to frequently go to the tank. Further, the tank may be placed far from the building of the installation in question.

In addition, the known art is aware of some industrial activities for a remote transmission of data relating to the level of the liquid gas contained in the LPG tanks. However, these industrial initiatives employ a very limited technology which sometimes is even inaccurate such as the replacement of the dial with potentiometers or with mechanical contacts and the remote cable transmission of the level or also the remote radio transmission of the level.

It is evident that these solutions are not suited to a precise detection of the level of liquid gas contained within the tanks. At least, these solutions require the installation of complex equipments and expensive connections which sometimes are unreliable or difficult to be operated.

SUMMARY OF THE INVENTION

The aim of the present invention is the elimination of the aforesaid inconveniences by using a suitable equipment which permits one to electronically detect the magnetic field generated by a magnet and to transform the magnetic field into a radio signal to be detected with precision by means of a suitable receiver. The receiver may placed also at a distance.

Another aim of the present invention is the removal of those inconveniences caused by the frequent visual checks of the operator and the solution of the problems relating to the data distribution as well as the simplification of the data processing, the detection being carried out in a complete and safe automatism.

Another aim of the present invention is the detection of data that are received by the magnet by means of an electronic equipment. The conception and realization of this electronic equipment is very simple and limits the total cost of a service which guarantees a high level of reliability in the data transmission.

All the aforesaid specific aims, advantages and functions are reached according to the present invention by means of a system for controlling the level of the liquid contained in a LPG tank or the like such as those which comprise a float equipped with a suitable device on which a magnet is mounted, characterized in that out of the said tank and over the said magnet there is a transmitting apparatus coupled with at least a magnetic reader, which apparatus and reader are able to convert the state of filling of the tank in signals on the base of the angular displacement of the magnet, which signals are transmitted to suitable devices of reception and alarm including the satellite devices.

BRIEF DESCRIPTION OF THE DRAWINGS

Further features and details of the present invention will be better understood from the following description, given as an example, not limiting the invention itself, on the base of the accompanying drawing wherein:

FIG. 1 shows a schematic view in vertical section of a tank provided with a conventional magnetic device of a transmitting apparatus coupled with at least a magnetic reader according to the invention;

FIG. 2 shows a schematic plan view of the magnetic reader, mounted on a suitable flange according to the invention;

FIG. 3 shows a schematic plan view of the magnetic reader according to the invention on the whole in a possible constructive solution;

FIG. 4 shows a schematic sectional view of the outer flanged covering and its inner detecting and transmitting electronic components;

FIGS. 5 and 6 show schematic views of the detecting and transmitting apparatus according to the present invention.

DESCRIPTION OF THE PREFERRED EMBODIMENT

With reference to the accompanying figures, number 1 denotes a tank, in particular a tank for LPG or other fuel or liquid to be kept under pressure, i.e. a metallic tank that is pressurized and completely hermetic.

The tank 1 is usually provided with a mechanic level gauge comprising a float. Depending on the level of the liquid contained, the float transmits a certain angular rotation to a stem 2. The upper end of the stem is connected with a magnet. The magnet is placed within a flanged body 3 which is fixed to the tank surface.

The peculiarity of the invention consists in placing a transmitting apparatus, which is coupled with at least a magnetic reader, out of the tank 1 and over the said magnet, which is placed within a flanged body. The transmitting apparatus and the magnetic reader are able to translate the filling state of the tank into signals on the basis of the angular shifting of the magnet, such signals being transmitted to suitable receiving devices.

More precisely, a magnetic reader 5 is arranged within a plastic container 4, rests on a base 5' and is connected with a transmitter 6 which transmits impulses or radio waves or the like which can be received by a receiving system, for instance a satellite system.

The receiving system depends on a signalling and alarm device which can be operated by the users or by the supplying organization which supplies the LPG.

The magnetic reader 5 uses electronic circuits generating HALL effect, namely, electronic components which are integrated in chips which are immersed in a magnetic field and generate a current at their connecting points, such a current being proportional to the magnetic field itself.

The said generators, which are integrated in chips, are placed in a suitable way in proximity of the flanged body 3 of the mechanic level existing in the tank, the level of which is to be detected remotely so that the generators can read the variation in the magnetic field generated by the contained magnet, this variation being translated in data to be then transmitted through the transmitter 6. The lower part of the plastic container 4 is equipped with a suitable connection 7 which is secured to the flanged body 3 including the magnet.

The system feeding is supplied by a long-autonomy battery 8, for instance the battery should last at least a year, or by another more suitable feeding means while a window 9 is obtained on the outer side of the container. Through the window it is possible to observe the data of a local analogue indicator which is arranged on the vertical part of the container 4.

The so-described system offers the possibility of gaining access to a piece of information, in this case the level of the liquid contained in the tank under pressure, without modifying the original structure so that it is possible to reach the double aim of limiting the costs and assuring the necessary safety.

In addition, the so-described system permits the aforesaid piece of information to be read through a system consisting of a plurality of sensors. These sensors detect the variation of the magnetic field of the present mechanic indicator and are arranged according to the necessities, for instance there may be four sensors or so much as a quadrant of 360° in order to obtain the greatest precision. Besides, it is possible to commutate the pieces of information into reference logic which may be transmitted in several ways such as:

using a radio transmitter with terrestrial receiver near the house or the structure of the user and from here via telephonic modem to the collecting centre of the supplying firm;

using a radio transmitter with terrestrial receiver near the house or the structure of the user and from here via satellite, on taking advantage of the existing satellite TV plant to the collecting firm and then to the distributing firm;

using a satellite transmitter via geostationary trasponder with a direct sending of data to an only collecting centre.

In conclusion, the present system avoids the inconvenience of a frequent visual control by the user and solves the problems related to the management of the distribution both in single firms and associated firms.

As it can be noted, the present invention is based on the employment of an electronic apparatus which is very simple as concerns the conception and realization. This apparatus limits the whole costs of production and assembly and permits a service which assures a degree of data transmission with a high level of safety.

The solution as described according to its employment on LPG tanks or the like may be employed of course on whatever tank on condition that it is provided with a magnetic indicator to be operated with different transmission means.

An expert of this field may make some changes and variants in the described and represented solution. However, such changes and variants are to be considered as included in the scope of protection of the invention if they are cited in one or more of the following claims.

What is claimed is:

1. A system for detecting a level of liquid in an LPG tank (1), comprising:

a stem (2) mounted for rotation in the tank, an angular position of the stem corresponding to a level of liquid in the tank, the stem having an upper end with a permanent magnet for creating a magnetic field which varies with rotation of the stem, variations of the magnetic field corresponding to angular positions of the stem;

a flanged body (3) connected to the tank, the upper end of the stem with the magnet, extending into the flanged body;

an electronic sensor (5) adjacent the flanged body (3) but outside the tank, the sensor being in the magnetic field and including a disk and four Hall-effect sensor elements equally circumferentially spaced around 360 degrees and around the magnetic field and mounted on the disk, each sensor element generating a current that is proportional to the variations in the magnetic field adjacent the sensor element so that the currents of all the sensor elements together create digital logic information corresponding to the angular position of the stem and thus to the level of liquid in the tank, each sensor element being a binary sensor element which is either on or off so that the digital logic information is binary information;

a radio transmitter (6) connected to the sensor (5) for transmitting the digital logic information to a remote location, the transmitter extending vertically from the disk in the container;

a container (4) over the sensor and the transmitter and outside the tank for protecting the sensor and the transmitter; and a battery in the container for powering the electronic sensor and the transmitter.

2. A system according to claim 1, wherein the container is made of plastic, and the flanged body includes a pair of connectors for connecting the flanged body to the tank.

3. A system according to claim 1, including a window in the container for viewing into the container, and wherein the container includes a base which separates the upper end of the stem from the sensor.

4. A system for controlling the level of gas or liquid contained in a LPG tank, the system comprising: a flanged body (3) connected to the tank; a container (4) mounter to the tank; an indication magnet mounted to the flanged body for generating a magnetic field in the container; an electronic sensor (5) in the container and adjacent the flanged body (3) but outside the tank, the sensor being in the magnetic field and including four Hall-effect sensor elements equally circumferentially spaced around 360 degrees and around the magnetic field, the sensor including a disk on which the four sensor elements are mounted and each sensor element generating a current that is proportional to the variations in the magnetic field adjacent the sensor element so that the currents of all the sensor elements together create digital logic information corresponding to the angular position of the stem and thus to the level of liquid in the tank, each sensor element being a binary sensor element which is either on or off so that the digital logic information is binary information; a radio transmitter (6) connected to the sensor (5) for transmitting the digital logic information to a remote location, the transmitter extending vertically from the disk in the container; and a battery in the container and connected to the sensor and the transmitter, for powering the sensor and the transmitter.

* * * * *